United States Patent

[11] 3,607,473

[72] Inventors John J. Grunwald
 New Haven;
 John P. Homrok, Terryville; Ralph R. Wilkinson, Waterbury, all of Conn.
[21] Appl. No. 709,955
[22] Filed Mar. 4, 1968
[45] Patented Sept. 21, 1971
[73] Assignee MacDermid Incorporated
 Waterbury, Conn.

[54] COMPOSITIONS FOR AND METHOD OF PRETREATING PLASTIC SURFACES TO IMPROVE ADHESION OF COATING MATERIALS
 16 Claims, No Drawings
[52] U.S. Cl. .................................................... 156/2,
 117/47 A, 117/118, 117/138.8 E
[51] Int. Cl. ..................................................... B44c 1/22,
 C23b 3/00
[50] Field of Search ............................................ 117/47 A,
 138.8 E, 12, 118; 156/3

[56] References Cited
UNITED STATES PATENTS

| | | | |
|---|---|---|---|
| 3,445,350 | 5/1969 | Klinger et al. ................. | 204/30 |
| 3,235,426 | 2/1966 | Bruner ......................... | 156/2 |

Primary Examiner—William D. Martin
Assistant Examiner—M. Sofocleous
Attorneys—Steward & Steward, Merrill F. Steward and Donald T. Steward ABSTRACT: Bath compositions and processes are disclosed for use in pretreating the surface of various synthetic molded plastics to improve adhesion to the surface thereof of films of different coating materials, such as paint, ink and adhesives, for example. An aqueous emulsion of an organic surface activating agent, followed by a strong acid aqueous oxidizing solution, are employed in the treatment of the plastic surface to effect the desired surface modification.

COMPOSITIONS FOR AND METHOD OF PRETREATING PLASTIC SURFACES TO IMPROVE ADHESION OF COATING MATERIALS

The invention herein disclosed is directed to novel pretreatment bath compositions, and processes of using such compositions, to enhance the bonding of various coating materials to the surface of molded synthetic polymer plastics. The invention relates generally to improving the adhesion or bonding of thin films of various coating materials on the surface of finished articles of molded synthetic plastics, particularly polyolefins such as polypropylene, polyethylene, polystyrene, and copolymers such ABS (acrylonitrile-butadiene-styrene) whose finished or as-molded surfaces are normally quite smooth and slippery and do not afford a good bonding base for coating materials applied subsequent to molding. The types of coatings for which the surface pretreatment is designed include paints, inks and stains applied in various ways as by spraying, dipping, brushing, roller coating, hot stamping or silk screening. Other coatings include vacuum-deposited metallic films and adhesives.

While some commercial painting and inking of molded plastics is practiced today, the procedures involved are usually quite specialized and require treatments which are not ordinarily suited for use in a plastic-fabricating shop. In the conventional method of coloring plastic, a dye is incorporated in the powdered or granular polymer material prior to molding. There are many occasions, however, where it is necessary or more convenient to apply the coloring or other coating material to the finished molded plastic article, yet be able to do this without encountering the highly specialized procedures mentioned above. The coloring of polypropylene, which because of its lower cost and many desirable physical properties is finding ever-increasing applications, is especially difficult to accomplish after molding.

Also it is frequently desirable to be able to print on or paint the surface of a molded plastic component for the purpose, for example, of providing product identification on molded containers, surface decoration or protective finish on the plastic. The problem of getting inks or paints to adhere properly to the surface of molded plastics is well known. While some special procedures and techniques have been developed heretofore in an attempt to improve both the procedures involved and the bonding strength of the paint, ink, etc., to the surface of the plastic, in most cases these earlier procedures have left much to be desired in good commercial practice.

A major purpose of the present invention, therefore, is to provide a relatively simple and effective way for printing, painting or otherwise coating the surface of molded plastic, and more particularly molded polyolefin plastics. Techniques and compositions are herein disclosed for use in treating the surface of molded plastic articles to permit such coating or coloring of the plastic surface to be effected in a simple, economical manner.

Since finished or molded plastic articles frequently have residual internal stresses as the result of the molding operation, if they are subjected to temperatures where softening to the point of incipient plastic flow is encountered, distortion or warping of the finished part is generally inevitable. An important aspect of the present invention accordingly is to provide treatment compositions and procedures for effecting coloring or coating of the surface of resin materials at temperatures which are well below the critical plastic flow temperatures of the substrate resins.

It has now been discovered and it is the basic concept of the invention herein disclosed, that the printing, painting or other coating as mentioned above of the surface of molded plastic articles to impart a different color for decorative or indicia purposes, can be accomplished by a pretreatment of the finished molded plastic article by contacting the surface to be coated with solutions of the type hereinafter disclosed. The procedure results in a greatly simplified process in comparison with those heretofore employed.

The novel procedure involves absorbing into the surface of the molded plastic article certain aliphatic or aromatic hydrocarbon surface-activating agents of the groups hereinafter defined, more especially by employing such agents in aqueous solution in finely divided microscopic particle size such that an apparently clear emulsion is obtained. This step is followed after rinsing by immersion of the article in a chromic-sulfuric-oxidizing bath, followed in turn by a final rinse in a reducing bath to reduce any residual chromium ions on the plastic surface. The molded plastic article is then rinsed again and dried and can be immediately (or subsequent) coated with paint, ink or other coating film to obtain excellent adhesion to the plastic surface.

A "standard" test for adhesion of the coating film has been devised and consists in pressing a piece of clear pressure-sensitive tape over the painted or printed area and then peeling the tape away. The number of times that this can be done using fresh tape each time without causing the coating film to pull off gives a good qualitative indication of the bonding or adhesion effected.

The surface activating agents found to be useful in carrying out the present invention comprise quite a variety of compounds which may be classified into the following main groups:

a. Saturated and unsaturated lower alkyl aliphatic chlorinated liquid hydrocarbons, of which trichloroethylene and carbon tetrachloride are of primary practical interest; also chlorinated aromatics such as mono- and di-chlorinated benzene b. Naturally occurring resins such as linseed, tung, tall and castor oils; also unsaturated alicyclic terpenes of which turpentine is of principal practical interest c. Heavy aromatic naphthas, comprising mixtures of saturated and unsaturated organic compounds including alkyl benzenes, tetralin, indane, acenaphthenes, acenaphthalenes and various other naphthalenes and alkyl naphthalenes having from 10 to 14 carbons, including naphthalene itself d. Polymeric acrylic acids used in conjunction with toluene or pyrroles, e.g. in n-methylpyrrolidone Molded polyolefin parts are treated in accordance with the present invention by immersing them for at least one minute in an aqueous emulsion containing one or more of the foregoing surface-activating agents. The concentration of the activating agent can be varied to suit particular needs so long as the treatment bath constitutes a stable emulsion, preferably clear or at least semitransparent. To assist in this, the pretreatment emulsions incorporate one or more surfactants with the activating agent or agents. In general, surfactants having an HLB (hydrophobic-hydrophilic-balance) number of from 10 to 18, preferably equal to or greater than 13, are found to be useful.

The invention is illustrated by the following examples which are given by way of explanation of the concept involved and its application in commercial practice. The examples are not intended to be all-encompassing of the invention since it will be readily apparent to those skilled in the art that the teaching herein provided may be applied to produce equivalent substitute compositions. The appended claims are accordingly intended to cover not only the specific examples here given but their lawful equivalents.

EXAMPLE I

A compression molded polypropylene ballpoint pen barrel is given a pretreatment by immersing it for a period of 15 minutes at a temperature of 150° F. in an aqueous emulsion of an activating agent, such emulsion having the following composition:

a. turpentine —50 mls.
b. surfactant —50 mls.
c. water —900 mls.

Surfactants such as "Igepal CO-630" and "CO-730", in substantially equal amounts, are satisfactory. These are nonionic emulsifying agents produced commercially by General Aniline & Film Corp. Dyestuff and Chemicals Division, and comprise alkyl phenoxypoly (ethyleneoxy) ethanols produced by reacting an alkylphenol with ethylene oxide. The general formula is $$RC_6H_4O(CH_2CH_2O)_nCH_2CH_2OH$$

where R is $C_8H_{17}$ or a higher homolog.

The preparation of the foregoing pretreatment emulsion best accomplished as follows: 50 mls. of steam-distilled wood turpentine and 40 mls. of "Igepal CO-630" are mixed with each other and heated to around 130° F. This mixture is then poured into 900 mls. of distilled water heated to 130° F. with constant stirring. To this is added 10 mls. of "Benax 2A 1 " (trade name of Dow Chemical Co. for sodium dodecyl diphenyl ether disulfonate). This later surfactant serves primarily to prevent clouding of the emulsion at operating temperatures around 150° F.

Following the first pretreatment bath, the plastic pen barrel is run through two cold water rinses and then immersed in a chromic-sulfuric oxidizing solution consisting of approximately 15 percent by weight chromic acid, 40 percent by weight sulfuric acid (66°B.e), the balance being water. This solution has a specific gravity of approximately 1.48 at a temperature of 175° F. The plastic is held in this solution for a period of about 5 minutes.

The oxidized surface of the plastic barrel is then thoroughly rinsed in cold water and immersed for 2 minutes at room temperature in a chrome-reducing solution which may consist of 0.25 ounce/gallon of sodium sulfate and 0.25 ounce/gallon of sodium bisulfite. A final cold water rinse follows this step, after which the plastic article is air-dried and ready for coating. Acrylic resin paints are quite satisfactory as paint coatings, while solvent or water-based inks are readily applied, too. The resulting painted surface shows excellent adhesion to the substrate, using as an indication the previously mentioned pressure-sensitive tape test. Up to ten "runs," i.e. applications and withdrawals of the pressure-sensitive tape are readily obtained without loss of the coating, as against loss of some coating after but one "run" on an untreated article.

EXAMPLE II

A molded polyethylene part (a bottle) is placed in an aqueous pretreatment emulsion of the following composition:
a. linseed oil —50 mls.
b. surfactants —50 mls.
c. water —900 mls.

The surfactant used in this example is "Triton X-100" which is the trade name of Rohm & Haas for surfactants of the alkylaryl polyether alcohol water-soluble type.

The foregoing emulsion is prepared by heating the water to about 130° F. and adding to it the previously mixed linseed oil and surfactant combination which is also at 130° F.

The plastic article is retained in the pretreatment emulsion for about 15 minutes at a solution temperatures of 170° F. Thereafter, the article is processed through the balance of the steps outlined in Example I, using a water-based acrylic paint as the coating material. The adhesion obtained from this procedure is equivalent to that obtained in Example I.

EXAMPLE III

A molded polypropylene luggage handle is placed in a pretreatment emulsion of the following composition:
a. trichloroethylene —35 mls.
b. surfactants —65 mls. pl c. water —900 mls.

In this formulation, the surfactants used are "Igepal CO630," 40 percent, and "Benax 2 A 1, " 25 percent, both by volume. The emulsion is prepared by adding one volume of water to 1 volume of the mixture of trichloroethylene and surfactants, and mixing at room temperature to obtain a homogeneous mass. The balance of the water (8 volumes) is then added at room temperature and mixed to obtain a clear emulsion. The plastic article is held in this pretreatment emulsion for 15 minutes at a solution temperature of 125° F. Thereafter, the article is processed through the balance of the steps outlined in Example I, using an alkyd paint as the coating material. The paint-plastic bond is in all ways equivalent to the adhesion obtained in previous examples.

EXAMPLE IV

A molded polystyrene cosmetic case is placed in an aqueous pretreatment emulsion of the following composition:
a. dichlorobenzene —25 mls.
b. chlorobenzene —25 mls.
c. surfactant —50 mls.
d. water —900 mls.

The surfactant used here is "Igepal CO- 630" and the preparation of the emulsion is similar to those outlined above. The polystyrene case is immersed for 15 minutes in this emulsion at a temperature of 185° F. Thereafter, the article is processed through the balance of the steps as in Example I, using an alkyd paint as the coating material. As before, the adhesion of paint to the treated substrate is excellent and withstands the tape-adhesion test successfully.

Other surface-activating agents from the group including castor oil, tung oil, and tall oil, all exhibit similar adhesion improving qualities when used in the form of clear aqueous oil-in-water emulsions similar to those of the foregoing examples.

The effectiveness of these emulsions in promoting surface modification of the plastic substrates is believed to be due in large part to the high surface energy made available by using the active adhesion promoting agent in finely divided or dispersed clear aqueous emulsion condition. All of the emulsions described in the foregoing examples show a very high order of dispersion. The particle sizes in Example I appear to be accurately described as a microemulsion with particle sizes from 50 to 500 angstroms. Those of Examples II through IV are at least macroemulsions whose active particle sizes are on the order of one-half to a maximum of about 50 microns. The benefits of these compositions in respect to lower operating temperatures, lower concentrations, equipment and process simplification, etc., are accordingly believed to be the direct result of employing the active agent in colloidal or highly dispersed form.

Chromic-sulfuric mixtures other than that used in Example I have also been employed usefully in this process, as shown below.

EXAMPLE V

A polypropylene part is immersed in the pretreatment emulsion of Example I for 15 minutes at 150° F. This is followed by a cold water rinse and then a 5 minute immersion in the following oxidizer at 175° F.
a. chromic acid —5 percent by wt.
b. sulfuric acid —40 percent by wt.
c. water —55 percent by wt.

This is followed by another cold water rinse, a 2-immersion in the chrome-reducer of Example I at room temperature, another cold water rinse and is finally air-dried. Parts processed using this cycle show excellent adhesion in the tape tests.

EXAMPLE VI

Another polypropylene part is immersed in the pretreatment emulsion of Example I for 15 minutes at 150° F., then given a cold water rinse and immersed for 5 minutes at 175° F., in the following somewhat different concentration of oxidizing bath components:
a. chromic acid —15 percent by wt.
b. sulfuric acid —15 percent by wt.
c. water —70 percent by wt.

This is followed by another cold water rinse, a 2-immersion in the chrome-reducer of Example I at room temperature, another cold water rinse and is finally air-dried and painted. Parts processed using this cycle also show good paint adhesion under the tape test.

EXAMPLE VII

Additional polypropylene sample parts processed through the several pretreatment emulsion compositions employed in the examples described above and then dried and weighed show that the pretreatment effects a gain in weight of the plastic in every case where good adhesion is obtained. This is seen in the following Table 1 in which the average weight of five sample parts is recorded for each of the various pretreatment emulsions designated from the foregoing examples, and for different immersion times.

TABLE 1

| Emulsion Composition | Weight change/sample (average of 5 samples) | | |
|---|---|---|---|
| Example Number: | Immersion time (min.) at 150° F. | Grams | Approximate percent original weight |
| 1 | 1 | +.0096 | +0.32 |
| 1 | 3 | +.0206 | +0.68 |
| 1 | 5 | +.0290 | +0.97 |
| 1 | 15 | +.0422 | +1.41 |
| 2 | 15 | +.0386 | +1.29 |
| 3 | 15 | +.0483 | +1.61 |
| 4 | 15 | +.0616 | +2.05 |

These same parts when processed through the oxidizer of Example I, dried and weighed exhibit a loss in weight. This is further illustrated in Table 2 which tabulates the results of immersing the same pretreated plastic parts in the chromic-sulfuric oxidizer at 175° F. for 5 minutes in each case.

TABLE 2

| Emulsion Composition | Weight change per sample after oxidizer bath (average of 5 samples) | | | |
|---|---|---|---|---|
| Example Number: | Immersion time (min.) at 150° F. | Grams | Approximate percent original weight | Adhesion test results [1] |
| 1 | 0 | 0.00 | | Failed 3rd run. |
| 1 | 1 | +.0079 | +0.28 | Passed. |
| 1 | 3 | +.0122 | +0.41 | Do. |
| 1 | 5 | +.0180 | +0.60 | Do. |
| 1 | 15 | +.0183 | +0.61 | Do. |
| 2 | 15 | +.0188 | +0.62 | Do. |
| 3 | 15 | +.0193 | +0.64 | Do. |
| 4 | 15 | +.0322 | +1.07 | Do. |

[1] Pressure sensitive tape (10 runs per sample).

Further comparison is afforded by the following additional combinations of pretreatment emulsions and oxidizers using polypropylene sample parts.

The emulsion compositions in the foregoing table are identified and prepared as follows:

| | Percent (volume) | |
|---|---|---|
| Emulsion A: | | |
| Turpentine | 40 | Heat 850 ml. water to 140° F. and add 150 ml. of turpentine concentrate to provide a working emulsion. |
| "Igepal Co 630" | 50 | |
| "Benax 2A1" (45% solution) | 10 | |
| Emulsion B: | | |
| Toluene | 40 | Heat 850 ml. water to 155° F. and add 150 ml. toluene concentrate. |
| "Brij 35-SP" | 60 | |
| Emulsion C: | | |
| Naphthalene (naphtha) | 40 | Heat 850 ml. water to 155° F. and add 150 ml. naphthalene concentrate. |
| "Igepal Co 630" | 50 | |
| "Benax 2A1" (45% solution) | 10 | |
| Emulsion D: | | |
| Toluene | 20 | Heat 850 ml. water to 145° F. and add 150 ml. toluene concentrate. |
| "Acrysol A-3" (polyacrylic acid) | 20 | |
| "Brij 35-SP" | 60 | |
| Emulsion E: | | |
| n-Methyl pyrrolidone | 30 | This mixture is homogenous and requires no special preparation. |
| "Acrysol A-3" | 30 | |
| "Benax 2A1" | 10 | |
| Water | 30 | |
| Emulsion F: | | |
| N dodecylochloride | 40 | Heat 850 ml. water to 140° F. and add dodecylchloride concentrate. |
| "Brij 35-SP" | 60 | |
| Emulsion G: | | |
| Trichloroethylene | 50 | Heat 850 ml. water to 110° F. and add 150 ml. concentrate. |
| "KAMAR-O" | 50 | |
| Emulsion H: | | |
| Carbon tetrachloride | 50 | Heat 850 ml. water to 140° F. and add 150 ml. of concentrate. |
| "KAMAR-O" | 50 | |

The proprietary surfactant "Brij- 35 SP" is described in McCutcheon's "Detergents and Emulsifiers" as a product of Atlas Chemical Industries, Inc., Willimington, Delaware as comprising a 23 -mole ethoxylate of lauryl alcohol, while "-Kamar O" is a product of Finetex, Inc., Patterson, New Jersey, comprising a proprietary blend of nonionic emulisifiers and alkyl aryl hydrotropes.

From the foregoing it thus appears in general that in those cases where satisfactory adhesion of the paint or ink is obtained, the pretreatment of the plastic is first accompanied by an increase in weight on immersion in the aqueous emulsion of the active agent, and this is followed by a substantial net weight loss in the oxidation step. For best adhesion results, the net weight loss appears to be on the order of 40 percent or more of the initial weight gain caused by immersion of the plastic in the emulsion.

As also appears from the foregoing tables, sulfuric-chromic acid systems appear unique as effective oxidizers. No apparent increase in adhesion is obtained where potassium permanganate and/or nitric acid systems are employed in test Nos. 1, 2 and 6 (Table 3). Yet the same emulsions used in those tests do give operative results where a chromic-sulfuric oxidizer is used. The chromium-reducing agent employed is not critical, as a variety of known reducers will work in place of the sodium sulfate-sodium bisulfite solution given in Example I. Solutions of such other reducers as iodine, iodides, sulfur dioxide, hydrogen peroxide, and arsenites are typical.

What is claimed is:

TABLE 3

| | Time (min.) | Temp. (° F.) | Oxidizer | Time (min.) | Temp. (° F.) | Percent gain in emulsion | Percent net gain after oxidizer | Adhesion of alkyd paint |
|---|---|---|---|---|---|---|---|---|
| 1 | (10) | A[1] (155) | 1 Molar KMnO$_4$ | (5) | (175) | +0.20 | +0.15 | None. |
| 2 | (10) | B[1] (155) | CrO$_3$ and 8N HNO$_3$ | (5) | (175) | +0.44 | +0.29 | Do. |
| 3 | (10) | C[1] (150) | Example 1 (CrO$_3$ and H$_2$SO$_4$) | (5) | (175) | +0.07 | −0.07 | Good. |
| 4 | (10) | D[1] (140) | do | (5) | (175) | +0.29 | +0.15 | Fair (improves on standing). |
| 5 | (10) | E[1] (180) | do | (5) | (175) | +0.01 | −0.02 | Do. |
| 6 | (10) | F[1] (150) | 1 molar KMnO$_4$ 2 molar H$_2$SO$_4$ | (5) | (160) | +0.13 | +0.13 | None. |
| 7 | (10) | G[1] (175) | Example 1 (CrO$_3$ and H$_2$SO$_4$) | (5) | (175) | +3.20 | +2.00 | Good. |
| 8 | (5) | H[1] (140) | do | (5) | (175) | +1.20 | +0.64 | Do. |

[1] Emulsion.

1. The process of preparing the surface of molded synthetic plastics of the group consisting of polyolefins and acrylonitrile-butadiene-styrene copolymers to improve adhesion thereon of thin films of coating materials of paint, ink or adhesive, which comprises immersing the molded plastic in a clear stable aqueous emulsion of a microscopic-particle-sized dispersion of a liquid surface activating agent and a surfactant, wherein the liquid-activating agent consists of at least one member selected from the following groups:
   a. chlorinated liquid hydrocarbons of the group consisting of trichloroethylene, carbon tetrachloride, dodecyl chloride, and mono- and di-chlorobenzene;
   b. naturally occuring resins of the group consisting of turpentine and linseed, tung, tall and castor oils;
   c. heavy aromatic naphthas consisting of naphthalenes and alkylnaphthalenes, acenaphthene, acenaphthalene, tetralin and indane;
   d. polymeric acrylic acids in combination with a member selected from the group consisting of toluene, pyrrole, and lower alkyl derivative of pyrrole; and said surfactant has an HLB number of from 10 to 18 and is present in amount at least equal in volume to the volume of liquid surface-activating agent; maintaining the immersion of the plastic in said emulsion for a period of at least one minute; removing the plastic from said emulsion and rinsing in water; immersing the plastic in an aqueous-oxidizing solution of chromic-sulfuric acid mixture; thereafter rinsing again and removing any residual chromium ions on the plastic surface by immersion in a dilute chromium ion-reducing solution; and drying the treated surface for the reception of a film of said coating material.

2. The process as defined in claim 1, wherein the plastic is polypropylene.

3. The process as defined in claim 2, wherein said aqueous emulsion has the following relative component composition per liter of solution:
   a. turpentine —50 mls.
   b. surfactant —50 mls.
   c. water —900 mls.

4. The process as defined in claim 3, wherein the plastic is immersed in said emulsion for from 1 to 15 minutes while maintaining the emulsion at a temperature of 145° to 155° F.

5. The method of preparing the emulsion defined in claim 3, which comprises admixing the components in the ratio of 50 mls. of turpentine and 40 mls. of surfactant, heating this mixture to 130° F. and adding it to the water, and finally heating this mixture to 150° Fl. and adding the remaining 10 mls. of surfactant, to make a clear emulsion.

6. The process as defined in claim 2, wherein said aqueous emulsion has the following relative component composition per liter of solution:
   a. linseed oil —50 mls.
   b. surfactant —50 mls.
   c. water —900 mls.

7. The process as defined in claim 6, wherein said emulsion is maintained at a temperature of about 170° F. and the plastic is immersed in this emulsion for about 15 minutes.

8. The process as defined in claim 2, wherein said aqueous emulsion has the following relative component composition per liter of solution:
   a. trichloroethylene —50 mls.
   b. surfactant —50 mls.
   c. water —900 mls.

9. The process as defined in claim 8, wherein the plastic is immersed in said emulsion for 12 to 15 minutes while maintaining the emulsion at a temperature of 180° to 190° F.

10. The process as defined in claim 2, wherein said aqueous emulsion has the following relative component composition per liter of solution:
    a. dichlorobenzene —25 mls.
    b. chlorobenzene —25 mls.
    c. surfactant —50 mls.
    d. water —900 mls.

11. The process as defined in claim 10, wherein the plastic is immersed in said emulsion for a period of about 15 minutes while maintaining said emulsion at a temperature of about 185° F.

12. The process as defined in claim 1, wherein said aqueous-oxidizing solution contains at least 5 percent by weight chromic acid and at least 15 percent by weight sulfuric acid.

13. The process as defined in claim 12, wherein said oxidizing solution contains:
    a. chromic acid —15 percent by wt.
    b. sulfuric acid—40 percent by wt.
    c. water —45 percent by wt.

14. The process as defined in claim 13, wherein the plastic is immersed in the oxidizing solution for 5 minutes at 175° F.

15. The process as defined in claim 1, wherein the chromium-reducing solution consists essentially, in addition to water, of about 0.25 of solution of sodium sulfate and sodium bisulfite.

16. The process of claim 1, wherein the said emulsion comprises about 35 to about 90 mls./liter of the surface-activating agent and about 50 to about 90 mls./liter of the said surfactant with the balance being water.